(12) United States Patent
Appeltans

(10) Patent No.: US 6,717,829 B2
(45) Date of Patent: Apr. 6, 2004

(54) CHARGE PUMP DEVICE WITH REDUCED RIPPLE AND SPURIOUS LOW FREQUENCY ELECTROMAGNETIC SIGNALS

(75) Inventor: Koen Emiel Jozef Appeltans, Sint-Truiden (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/173,848

(22) Filed: Jun. 19, 2002

(65) Prior Publication Data
US 2002/0196643 A1 Dec. 26, 2002

(30) Foreign Application Priority Data
Jun. 20, 2001 (EP) ............................................. 01401637

(51) Int. Cl.$^7$ ................................................ H02M 3/07
(52) U.S. Cl. ............................................ 363/59; 363/60
(58) Field of Search ...................................... 363/59, 60

(56) References Cited

U.S. PATENT DOCUMENTS

| | | | |
|---|---|---|---|
| 5,132,895 A | | 7/1992 | Kase |
| 5,339,236 A | | 8/1994 | Tamagawa |
| 5,596,489 A | * | 1/1997 | Bazes ........................... 363/62 |
| 5,712,777 A | * | 1/1998 | Nicollini et al. ............... 363/60 |
| 5,923,204 A | * | 7/1999 | Rapeli et al. ................ 327/337 |
| 6,043,998 A | | 3/2000 | Hirashima et al. |

FOREIGN PATENT DOCUMENTS

| | | |
|---|---|---|
| EP | 0 700 146 A1 | 3/1996 |
| EP | 0 841 629 A2 | 5/1998 |

OTHER PUBLICATIONS

Patent Abstracts of Japan, vol. 1998, No. 8, Jun. 30, 1998 & JP 10 075567 A, Mar. 17, 1998.

* cited by examiner

*Primary Examiner*—Jeffrey Sterrett
(74) *Attorney, Agent, or Firm*—Sughrue Mion, PLLC

(57) ABSTRACT

Charge pump circuit providing a boosted output voltage (Vout) from an input DC voltage (Vin) and including a first capacitor (1) to which the input voltage is periodically applied for a determined first time ($\phi'1$) by means of switch elements (3A, 3B) and another capacitor (2) to which the charge from the first capacitor is periodically transmitted by means of switch elements (4A, 4B) switched on for a determined second time ($\phi'2$), said another capacitor being connected, on one side, to a terminal receiving the input voltage and, on the other side, to a terminal providing the boosted output voltage.

A voltage and/or current control device includes means (9, 3C, 4C) controlling the charge transmitted to the first capacitor during first times according to a determined reference voltage (Vref) and the charge transmitted from the first capacitor to the second during second times according to the boosted output voltage.

4 Claims, 1 Drawing Sheet

CHARGE PUMP DEVICE WITH REDUCED RIPPLE AND SPURIOUS LOW FREQUENCY ELECTROMAGNETIC SIGNALS

The invention relates to charge pump circuits, as for instance found in voltage regulators and power supplies, and more particularly to a voltage and/or current control device for a charge pump circuit.

Charge pump circuits are used to provide boosted voltages from lower input voltages in integrated circuits when there is a need for such a boosted voltage to feed as required an internal sub-circuit and/or a coupled external circuit requiring a voltage which is higher than the supply voltage which is supplied otherwise.

In a known solution, the output supply obtained from a charge pump circuit is submitted to an on-off regulation triggered from a comparator circuit. This comparator circuit controls charge pump circuit switch elements in order to have a required boosted voltage provided at an output of the charge pump circuit, as long as the voltage at this output does not exceed a determined first threshold value. It also controls the charge pump circuit switch elements in order to have a high impedance at the charge pump circuit output when the output voltage exceeds the first threshold value and as long as this output voltage remains higher than a second threshold value, smaller than the first threshold value. Such an on-off regulation involving successive switching operations generates spurious signals and more particularly spurious low frequency electromagnetic signals. Furthermore hysteresis is associated with the use of two voltage threshold values and it induces spurious output voltage ripples.

An object of this invention, therefore, is to provide an improved charge pump circuit supplying a boosted output voltage from an input DC voltage. Such a circuit includes capacitors with a first capacitor to which the input voltage is periodically applied for a determined first time by means of switch elements of a first switch module and another capacitor to which the charge from the first capacitor is periodically transmitted by means of switch elements of a second switch module which are switched on for a determined second time which is included between two successive first times. Said another capacitor is connected, on one side, to an input terminal receiving the input voltage and, on the other side, to an output terminal providing the boosted output voltage.

According to the invention, the charge pump circuit comprises a control device for controlling the charge transmitted to the first capacitor during said first times according to a determined reference voltage and the charge transmitted from the first capacitor to the second capacitor during said second times according to the voltage obtained at the output terminal.

An embodiment of a charge pump circuit according to the invention, comprises a control device including a common control means for controlling the charges respectively transmitted to the first capacitor and between the first and the other capacitor, said means being activated under a control according to the reference voltage during said first times and under a control according to the boosted output voltage during said second times.

Common control means are preferably inserted between the input terminal receiving the input voltage and a junction point which is common to two switch elements respectively connected each on a different side of capacitor which are alternatively switched on either during first times for one or during second times for the other.

According to a preferred embodiment, common control means corresponds to a transistor having a gate linked by a further switch element of the first switch module to a terminal providing said reference voltage and by another switch element of the second switch module to the output terminal.

These and other objects, advantages and features of the invention will become apparent from the following description thereof taken in conjunction with the accompanying drawings below listed.

Figure 1:
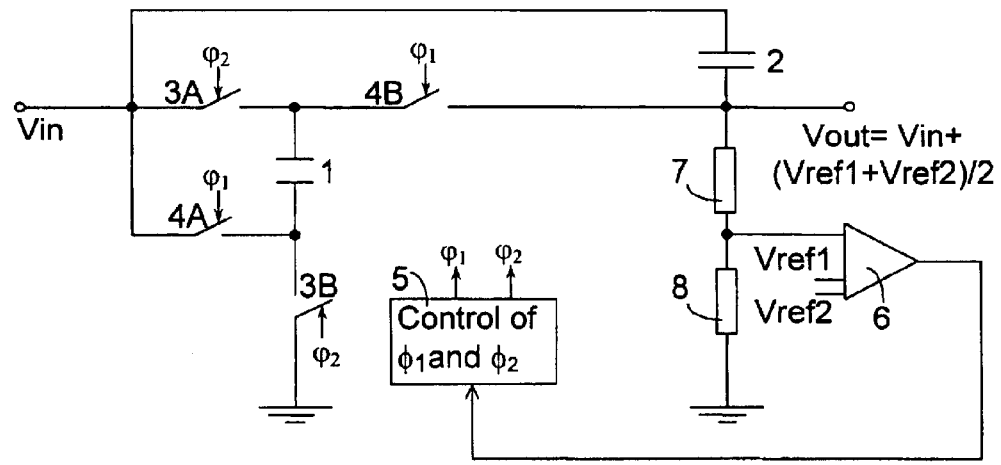
FIG. 1 illustrates an example of a charge pump circuit according to prior art.

As indicated above FIG. 1 relates to a known charge pump circuit 1 as found for instance in a power supply or a voltage regulator for boosting a DC input voltage Vin to an appropriate upper DC voltage level Vout required by an user circuit operated in relation with the input voltage Vin. The charge pump circuit comprises two capacitors 1 and 2 associated with two switch modules made for instance of NMOS elements, each module including two simultaneously controlled switch elements referenced 3A, 3B for a first of the two switch modules and 4A, 4B for the second switch module.

Capacitor 1 is located between the two switch elements 3A, 3B with switch element 3A connected to an input terminal of the charge pump circuit through which input voltage Vin is applied and with switch element 3B connected to a ground terminal. Accordingly capacitor 1 is charged at input voltage Vin as soon as the two switch elements 3A, 3B are switched on during a time $\phi 1$ corresponding to a voltage input pulse long enough to restore a determined charge during a one pulse boosting phase, such boosting phases being usually subsequent to an initial charging phase during which capacitor 1 is charged from scratch.

Capacitor 2 is located between the input terminal receiving voltage Vin and an output terminal of the charge pump circuit through which output voltage Vout is provided and also between the two switch elements 4A, 4B. Switch element 4A is connected on one side to the input terminal of the charge pump circuit and on the other side to a junction point located between capacitor 1 and switch element 3B. Switch element 4B is connected on one side to the output terminal of the charge pump circuit and on the other side to a junction point located between capacitor 1 and switch element 3A. The charge stored in capacitor 1 is transferred to buffer capacitor 2, when switch elements 4A and 4B are switched on during a time $\phi 2$ during which switch elements 3A and 3B are switched off. Time $\phi 2$ corresponds to a voltage pulse long enough to restore the charge of capacitor 2 to a predetermined level at the end of a one pulse boosting phase.

Control means 5 are associated to switch elements 3A, 3B and 4A, 4B, that they drive under control of a triggering voltage logic based on a comparator 6 linked to the output terminal of the charge pump circuit through a voltage dividing bridge. Comparator 6 is connected by a first input to a junction point common to two resistors 7 and 8 of the voltage dividing bridge, with resistor 7 connected to the output terminal of the charge pump circuit and resistor 8 connected to the ground terminal.

Two threshold voltages Vref1 and Vref2 are applied to two second inputs of comparator 6 for comparison purposes with the image of the output voltage of the pump charge circuit which is obtained through the voltage dividing bridge. Output voltage Vout corresponds to the sum of input voltage Vin with half of the sum of Vref1 with Vref2.

When the voltage at the first input of comparator 6 exceeds Vref1 the output of the pump charge circuit is driven to a high impedance and remains at this high impedance as long as the output voltage remains above voltage threshold Vref2 which is lower than Vref1.

After an initial charging phase, a recharge of capacitor 1 is periodically insured as soon as switch elements 3A and 3B are simultaneously and periodically switched on by control means 5 which receives pulse signals $\phi 1$ from a timer. Switch elements 4A and 4B are simultaneously and periodically switched on by control means 5 when switch elements 3A, 3B are switched off which receives pulse signals $\phi 2$ from the timer, with $\phi 2$ as provided by the timer corresponding at least approximately to the inverted signal of $\phi 1$.

A transfer of charge from capacitor 1 to capacitor 2 occurs during times $\phi 2$, such a transfer is stopped by control means 5 under control of comparator 6, as soon as a voltage higher than Vref1 is applied to the comparator by means of the dividing bridge As previously indicated, unwanted low frequency signals are generated due to the on-off regulation. Voltage ripple is caused by the hysteresis associated to this on-off regulation in relation with the variations of the output voltage between the two thresholds Vref1 and Vref2.

Figure 2:
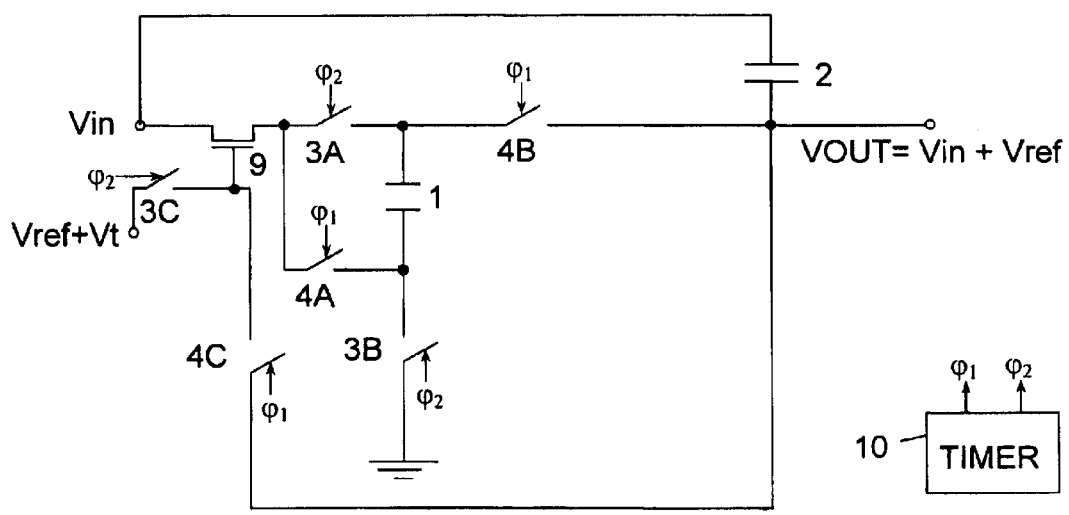
FIG. 2 illustrates a charge pump circuit according to the invention.

An improvement of such a charge pump circuit is shown on FIG. 2. Same references are used for the elements common to the prior art solution shown on FIG. 1 and to the circuit according to the invention.

Capacitor 1 remains located between two switch elements 3A, 3B of a same first switch module having three elements, with switch element 3B connected to a ground terminal. Switch element 3A is connected to the input terminal of the charge pump circuit by means of a device 9. This device is for instance a transistor such as a NMOS FET chosen for its ratio size/efficiency.

Capacitor 2 remains located between the input terminal receiving voltage Vin and the output terminal of the charge pump circuit through which output voltage Vout is provided. Switch element 4A is a part of a second switch module having three elements, it is again connected on one side to a junction point located between capacitor 1 and switch element 3B. It is connected on its other side to a junction point located between device 9 and switch element 3A. Switch element 4B which belongs to the said second switch module remains connected on one side to the output terminal of the charge pump circuit and to a junction point located between capacitor 1 and switch element 3A, on the other side.

According to the invention, a voltage reference Vref, corresponding to a threshold loss, is applied to the gate of device 9 by means of a third switch element 3C of the first switch module when switch elements 3A, 3B are switched on for a time $\phi 1$, as defined above. The gate of device 9 is also linked to the output of the charge pump circuit by means of a third switch element 4C of the second switch module.

Capacitor 1 is initially charged, then recharged, as soon as switch elements 3A, 3B, 3C are switched on by periodic pulse signals $\phi'1$ from a timer 10 which also delivers pulse signals $\phi'2$ corresponding broadly to pulse signals $\phi 1$ and $\phi 2$. During $\phi'1$, the input voltage Vin provided to the input terminal of the pump charge circuit, which is for instance a 20 volts DC voltage, is then applied to capacitor 1 through device 9. This device 9 then controls the current circulating through switch element 3A in accordance with reference voltage Vref, which is for instance a 10 volts DC voltage. In a preferred embodiment, an additional voltage Vt is added to voltage Vref at the gate of device 9 through switch element 3C to compensate for the threshold of device 9.

A transfer of charge from capacitor 1 to capacitor 2 occurs during times $\phi'2$, through switch elements 4A, 4B and the output voltage Vout obtained at the output terminal of the charge pump circuit is applied to the gate of device 9 by means of switch element 4C.

The output voltage that is obtained corresponds to the sum of voltages Vin and Vref.

The suppression of the comparator with two voltage references, as found in the prior art, reduces the ripple and the spurious low frequency electromagnetic signals. Inrush current is also limited due to the link established between the output terminal of the charge pump circuit and the gate of device 9 through switch element 4C.

What is claimed is:

1. A charge pump circuit providing a boosted output voltage from an input DC voltage and comprising:
   a first capacitor to which the input voltage is periodically applied for a determined first time by means of first switch elements of a first switch module, and
   a second capacitor to which the charge from the first capacitor is periodically transmitted by means of second switch elements of a second switch module which are switched on for a determined second time which is included between two successive first determined times, said second capacitor having a first terminal connected to an input terminal receiving the input voltage and a second terminal connected and, on the other side, to an output terminal providing the boosted output voltage said circuit comprising a control device including a common control means for controlling the charge transmitted to the first capacitor during said first times according to a determined reference voltage and the charge transmitted from the first capacitor to the second capacitor during said second times according to the boosted output voltage obtained at the output terminal, wherein said common control means is a device having a control electrode linked by a switch element of the first switch module to a terminal providing said reference voltage and by a switch element of the second switch module to the output terminal.

2. The charge pump circuit according to claim 1, wherein said common control means is activated under a control according to said reference voltage during said first times and under a control according to the boosted output voltage during said second times.

3. A charge pump circuit according to claim 2, wherein said common control means are inserted between the input terminal receiving the input voltage and a junction point which is common to one of the first switch elements and one of the second switch elements respectively, each connected on a different side of the first capacitor, which are alternatively switched on either during first times for one of the first switch elements or during second times for one of the second switch elements.

4. A charge pump circuit according to claim 1, wherein the common control means comprises a transistor, wherein the control electrode is a gate of the transistor.

* * * * *